United States Patent
Mohen et al.

(10) Patent No.: US 10,108,914 B2
(45) Date of Patent: *Oct. 23, 2018

(54) METHOD AND SYSTEM FOR MORPHING OBJECT TYPES IN ENTERPRISE CONTENT MANAGEMENT SYSTEMS

(71) Applicant: OPEN TEXT CORPORATION, Waterloo (CA)

(72) Inventors: Michael T. Mohen, Millington, MD (US); Christopher Dyde, Haddonfield, NJ (US)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,063

(22) Filed: May 31, 2017

(65) Prior Publication Data

US 2017/0262777 A1    Sep. 14, 2017

Related U.S. Application Data

(63) Continuation of application No. 13/926,573, filed on Jun. 25, 2013, now Pat. No. 9,697,484.

(60) Provisional application No. 61/782,238, filed on Mar. 14, 2013.

(51) Int. Cl.
*G06Q 10/00* (2012.01)
*G06Q 10/06* (2012.01)
*G06F 17/30* (2006.01)

(52) U.S. Cl.
CPC ......... *G06Q 10/0631* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,210,824 A | 5/1993 | Putz | |
| 5,550,976 A | 8/1996 | Henderson et al. | |
| 6,381,600 B1 | 4/2002 | Lau | |
| 6,408,342 B1 | 6/2002 | Moore | |
| 6,795,868 B1 | 9/2004 | Dingman et al. | |
| 7,853,553 B2 * | 12/2010 | Lankinen | G06F 17/30569 707/602 |
| 8,087,647 B2 | 1/2012 | Endo | |
| 9,697,484 B1 | 7/2017 | Mohen et al. | |

(Continued)

OTHER PUBLICATIONS

Office Action issued for U.S. Appl. No. 13/926,573, dated Apr. 20, 2015, 12 pages.

(Continued)

*Primary Examiner* — Mehmet Yesildag
(74) *Attorney, Agent, or Firm* — Sprinkle IP Law Group (57) ABSTRACT

Morphing object types in enterprise content management systems is described. A text properties file is created that maps properties associated with an object type to properties associated with a new object type. A database associated with an enterprise content management system is queried to retrieve objects based on the object type. The objects are stored in a staging database. The objects are deleted from the database. Property tables are created in the database based on the new object type. The objects are migrated from the staging database to the newly created property tables based on the text properties file.

18 Claims, 5 Drawing Sheets

(56) References Cited

U.S. PATENT DOCUMENTS

| | | |
|---|---|---|
| 2001/0049753 A1 | 12/2001 | Gary |
| 2005/0010919 A1 | 1/2005 | Ramanathan |
| 2005/0033726 A1 | 2/2005 | Wu |
| 2005/0131970 A1 | 6/2005 | Salazar |
| 2005/0187974 A1 | 8/2005 | Gong |
| 2005/0243604 A1 | 11/2005 | Harken |
| 2005/0251533 A1 | 11/2005 | Harken |
| 2005/0256892 A1 | 11/2005 | Harken |
| 2006/0064416 A1 | 3/2006 | Sim-Tang |
| 2006/0212486 A1 | 9/2006 | Kennis |
| 2006/0235899 A1 | 10/2006 | Tucker |
| 2007/0156754 A1 | 7/2007 | Busch |
| 2007/0185926 A1 | 8/2007 | Prahlad et al. |
| 2007/0220022 A1* | 9/2007 | Lankinen .......... G06F 17/30569 |
| 2008/0027944 A1 | 1/2008 | Itikarlapalli |
| 2009/0063504 A1 | 3/2009 | Banister |
| 2009/0077094 A1 | 3/2009 | Bodain |
| 2009/0077114 A1 | 3/2009 | Zachariah |
| 2009/0228527 A1 | 9/2009 | Wang |
| 2010/0223608 A1 | 9/2010 | DeHaan |
| 2011/0010518 A1 | 1/2011 | Kavuri et al. |
| 2011/0066593 A1 | 3/2011 | Ahluwalia |
| 2011/0107327 A1 | 5/2011 | Barkie |
| 2011/0153697 A1 | 6/2011 | Nickolov |
| 2012/0030247 A1* | 2/2012 | Yambal ............ G06F 17/30079 707/802 |
| 2012/0054556 A1 | 3/2012 | Grube |
| 2012/0054731 A1 | 3/2012 | Aravamudan |
| 2012/0066179 A1 | 3/2012 | Saika |
| 2012/0089711 A1 | 4/2012 | Zager |
| 2012/0109940 A1 | 5/2012 | Ishii et al. |
| 2012/0143831 A1 | 6/2012 | Amulu |
| 2012/0265726 A1 | 10/2012 | Padmanabhan et al. |
| 2012/0330911 A1 | 12/2012 | Grueheid |
| 2013/0024634 A1 | 1/2013 | Shitomi |
| 2013/0124503 A1 | 5/2013 | Ishii |
| 2013/0166855 A1 | 6/2013 | Batwara et al. |
| 2013/0173547 A1 | 7/2013 | Cline et al. |
| 2013/0282751 A1 | 10/2013 | Lagerblad |
| 2014/0040182 A1* | 2/2014 | Gilder ............. G06F 17/30578 707/602 |
| 2014/0222872 A1* | 8/2014 | Rambo ............ G06F 17/30345 707/803 |
| 2015/0339359 A1 | 11/2015 | Takaoka et al. |

OTHER PUBLICATIONS

Office Action issued for U.S. Appl. No. 13/926,573, dated Oct. 23, 2015, 17 pages.

Office Action issued for U.S. Appl. No. 13/926,573, dated Feb. 9, 2016, 17 pages.

Office Action issued for U.S. Appl. No. 13/926,573, dated Sep. 29, 2016, 15 pages.

Office Action for U.S. Appl. No. 13/910,342, dated Jan. 16, 2015, 14 pgs.

Office Action for U.S. Appl. No. 13/910,342, dated Jul. 10, 2015, 18 pgs.

Office Action for U.S. Appl. No. 13/926,601, dated Aug. 7, 2015, 8 pages.

Office Action for U.S. Appl. No. 13/926,601, dated Dec. 30, 2015, 8 pages.

Office Action for U.S. Appl. No. 13/910,342, dated Jan. 12, 2016, 19 pgs.

Office Action for U.S. Appl. No. 13/926,601, dated May 16, 2016, 9 pgs.

Office Action for U.S. Appl. No. 13/910,342, dated Jul. 12, 2016, 22 pgs.

Office Action for U.S. Appl. No. 13/926,601, dated Sep. 2, 2016, 8 pgs.

Office Action for U.S. Appl. No. 13/910,342, dated Nov. 18, 2016, 24 pgs.

Office Action for U.S. Appl. No. 13/926,601, dated Jan. 30, 2017, 9 pgs.

Office Action for U.S. Appl. No. 13/926,601, dated May 17, 2017, 9 pgs.

Office Action for U.S. Appl. No. 13/910,342, dated Jul. 10, 2017, 24 pgs.

Office Action for U.S. Appl. No. 13/926,601, dated Nov. 1, 2017, 10 pgs.

Office Action for U.S. Appl. No. 13/910,342, dated Feb. 21, 2018, 6 pgs.

Office Action for U.S. Appl. No. 13/926,601, dated Mar. 9, 2018, 14 pgs.

* cited by examiner

| | objects 302 | |
|---|---|---|
| object_ID | 09xx0010 | 09xx0011 |
| object_name | sop#1 | sop#2 |
| object_type | dcm_doc | dcm_doc |
| sop_number | 1 | 2 |
| affected_dept | RND, PRD, MKT | PRD, MKT |
| | dm_sysobject_s 304 | |
| object_ID | object_name | object_type |
| 09xx0010 | sop#1 | dcm_doc |
| 09xx0011 | sop#2 | dcm_doc |
| | dcm_doc_s 306 | |
| object_ID | sop_number | |
| 09xx0010 | 1 | |
| 09xx0011 | 2 | |
| | dcm_doc_r 308 | |
| object_ID | i_position | affected_dept |
| 09xx0010 | -1 | RND |
| 09xx0010 | -2 | PRD |
| 09xx0010 | -3 | MKT |
| 09xx0011 | -1 | PRD |
| 09xx0011 | -2 | MKT |

| | objects 312 | |
|---|---|---|
| object_ID | 09xx0010 | 09xx0011 |
| object_name | sop#1 | sop#2 |
| object_type | d2_sop | d2_sop |
| sop_number | 1 | 2 |
| affected_dept | Research, Products, Marketing | Products, Marketing |
| approval_dept | Research | Products |
| | dm_sysobject_s 314 | |
| object_ID | object_name | object_type |
| 09xx0010 | sop#1 | d2_sop |
| 09xx0011 | sop#2 | d2_sop |
| | d2_sop_s 316 | |
| object_ID | sop_number | approval_dept |
| 09xx0010 | 1 | Research |
| 09xx0011 | 2 | Products |
| | d2_sop_r 318 | |
| object_ID | i_position | affected_dept |
| 09xx0010 | -1 | Research |
| 09xx0010 | -2 | Products |
| 09xx0010 | -3 | Marketing |
| 09xx0011 | -1 | Products |
| 09xx0011 | -2 | Marketing |

METHOD AND SYSTEM FOR MORPHING OBJECT TYPES IN ENTERPRISE CONTENT MANAGEMENT SYSTEMS

CROSS REFERENCE TO RELATED APPLICATIONS

This application is a continuation of, and claims a benefit of priority under 35 U.S.C. 120 of the filing date of U.S. patent application Ser. No. 13/926,573 entitled "METHOD AND SYSTEM FOR MORPHING OBJECT TYPES IN ENTERPRISE CONTENT MANAGEMENT SYSTEMS" filed on Jun. 25, 2013, now U.S. Pat. No. 9,697,484, which claims the benefit of U.S. Provisional Patent Application No. 61/782,238 entitled, "MIGRATION APPLIANCE," filed Mar. 14, 2013, the entire contents of which are hereby expressly incorporated by reference for all purposes.

BACKGROUND

An enterprise content management system provides online access to content stored using digital technology, information formerly available only on paper, microfilm, or microfiche. An enterprise content management system generates new metadata about content as the content is checked in and out. Information about how and when content is used can enable an enterprise content management system to acquire new filtering, routing and search pathways, and retention-rule decisions. An enterprise content management system provides access to data about email and instant messaging, which may be used in business decisions. The audit trail generated by an enterprise content management system enhances document security, and provides metrics to help measure productivity and identify efficiency.

An enterprise content management system provides integrated solutions for multiple departments and systems, as many documents may cross multiple departments and affect multiple processes. For example, imaging, document management, and workflow can be combined in a customer service department to enable customer service agents to better resolve customer inquiries. Likewise, an accounting department may access supplier invoices from an electronic resource management system, access purchase orders from an imaging system, and access contracts from a document management system as part of an approval workflow. Similarly, an organization may present information via the World Wide Web, which requires managing web content.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

An organization may need to morph object types in the organization's enterprise content management system, such as when adding additional properties to some object types while upgrading the organization's enterprise content management system to function with the next generation of object types. In the prior art, some morphing tools use an application program interface's change object command to morph an organization's object types in the organization's enterprise content management system. A change object command can change object types in an enterprise content management system, but executing this command results in creating a significant number of audit trail objects for the change. For example, an enterprise content management system with 1 million documents may have 40 million objects, but 30 million of these objects may be related to audit trails, such that morphing object types via the change object command creates millions of additional audit trail-related objects. Furthermore, executing this change object command also results in retaining all of the metadata for objects which have their object type changed, even if some of the metadata is stale or useless. Additionally, the change object command may not retain or apply custom property values to object types. For example, if an organization customized many of the object types' properties to change metadata from 12 characters to 32 characters, the change object command may not retain these customized changes, thereby requiring enterprise content management system administrators to engage in the lengthy and error-prone process of personally writing customized code to retain these customized changes.

Embodiments herein enable morphing object types between enterprise content management systems. A text properties file is created that maps properties associated with an object type to properties associated with a new object type. For example, a morphing tool creates a text properties file that maps properties associated with a dcm doc object type to properties associated with a d2_sop object type, which includes an approval_dept property that the dcm_doc object type lacks. A database associated with an enterprise content management system is queried to retrieve objects based on the object type. For example, the morphing tool queries a Documentum® database and retrieves two dcm_doc objects for the dcm_doc object type. The objects are stored in a staging database. For example, the morphing tool stores the two dcm_doc objects in a Mongo® database. The objects are deleted from the database. For example, the morphing tool deletes the two dcm_doc objects from the Documentum® database. Property tables are created in the database based on the new object type. For example, the morphing tool creates property tables for the d2_sop object type in the Documentum® database. The objects are migrated from the staging database to the newly created property tables based on the map. For example, the morphing tool migrates the two dcm_doc objects from the Mongo database to the property tables for the d2_sop object type in the Documentum® database based on the text properties file, thereby creating two new d2_sop objects in the Documentum® database. In one embodiment, the text properties file is an XML map.

The morphing tool directly extracts and loads data at the database level, enabling the morphing of object types more quickly and efficiently than prior art morphing tools, selectively retaining only the useful metadata for objects which have their object type changed. The morphing tool also morphs object types without creating a significant number of audit trail objects for the change, and without requiring enterprise content management system administrators to engage in the lengthy and error-prone process of personally writing customized code to retain customized changes.

Figure 1:
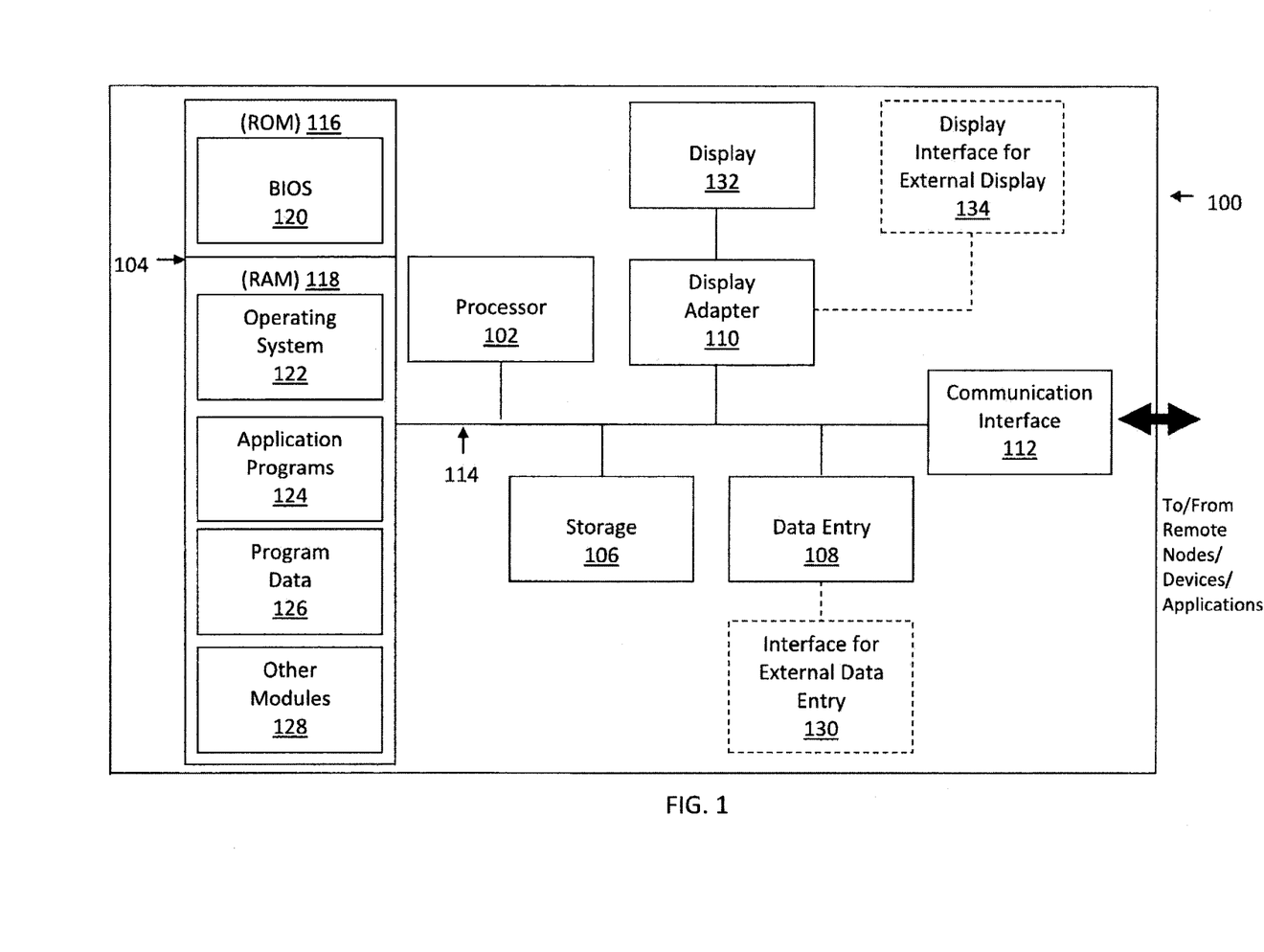
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable ROM (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for morphing object types in enterprise content management systems.

In the prior art, morphing tools retain all of the metadata for objects which have their object type changed, even if some of the metadata is stale or useless, create a significant number of audit trail objects for changes, and require enterprise content management system administrators to engage in the lengthy and error-prone process of personally writing customized code to retain customized changes. Embodiments herein provide a morphing tool that directly extracts and loads data at the database level, enabling the morphing of object types more quickly and efficiently than prior art morphing tools, selectively retaining only the useful metadata for objects which have their object type changed. The morphing tool also morphs object types without creating a significant number of audit trail objects for the change, and without requiring enterprise content management system administrators to engage in the lengthy and error-prone process of personally writing customized code to retain customized changes.

Figure 2:
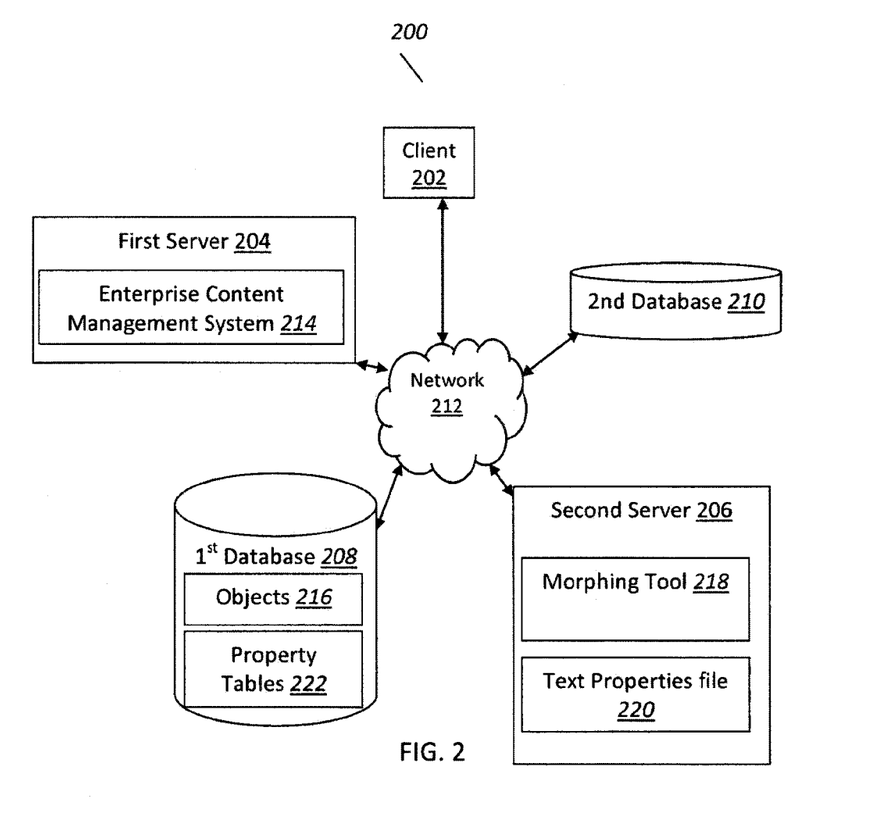
FIG. 2 illustrates a block diagram of an example system for morphing object types in enterprise content management systems, under an embodiment.

FIG. 2 illustrates a block diagram of a system that implements morphing object types in enterprise management systems, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a first server 204 and a second server 206 that are provided by a hosting company. The client 202, the servers 204-206, a first database 208, and a second database 210 communicate via a network 212. The first server 204 includes an enterprise content management system 214 associated with the first database 208, which includes objects 216; while the second server 206 includes a morphing tool 218 and a text properties file 220, which are associated with the second database 210. The morphing tool 218 can retrieve at least some of the objects 216 from the first database 208, store these objects 216 on the second database 210, create property tables 222 on the first database 208 based on the text properties file 220, and migrate the objects 216 from the second database 210 to the property tables 222 on the first database 208 based on the text properties file 220 to create new objects. The first database 208 may be referred to as a Documentum® database 208 provided by EMC® Corporation, the second database 210 may be referred to as a Mongo® database 210, which is a NoSQL non-relational database provided by 10gen® corporation, and the text properties file 220 may be referred to as an text properties file 220.

The client 202 and the servers 204-206 may each be substantially similar to the system 100 depicted in FIG. 1. Although FIG. 2 depicts only one client 202, two servers 204-206, two databases 208-210, one network 212, and one of each of the system elements 214-222, the system 200 may include any number of clients 202, servers 204-206, databases 208-210, networks 212, and each of the system elements 214-222.

Figure 3A:
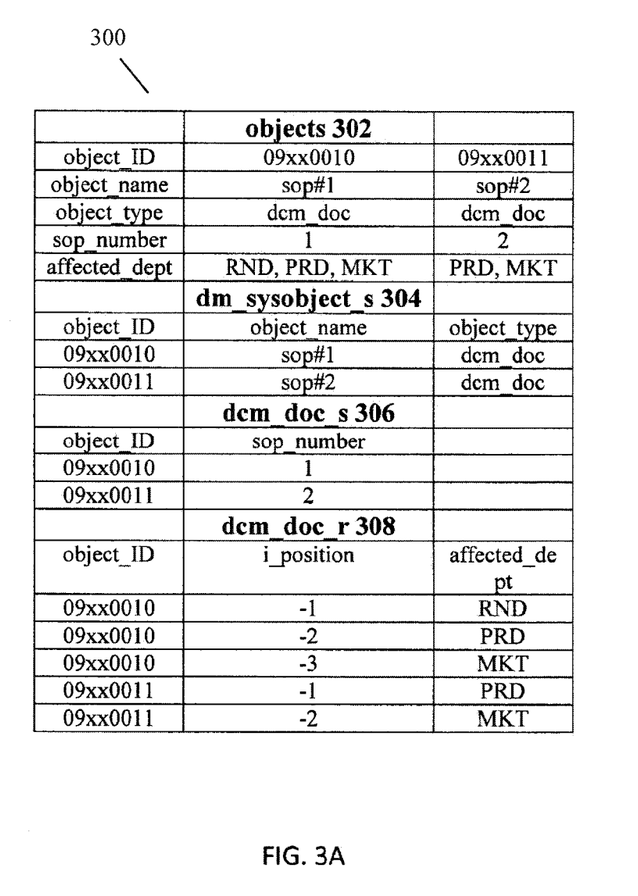
FIG. 3A and FIG. 3B illustrate block diagrams of example objects and tables for morphing object types in enterprise content management systems, under an embodiment.
Figure 3B:
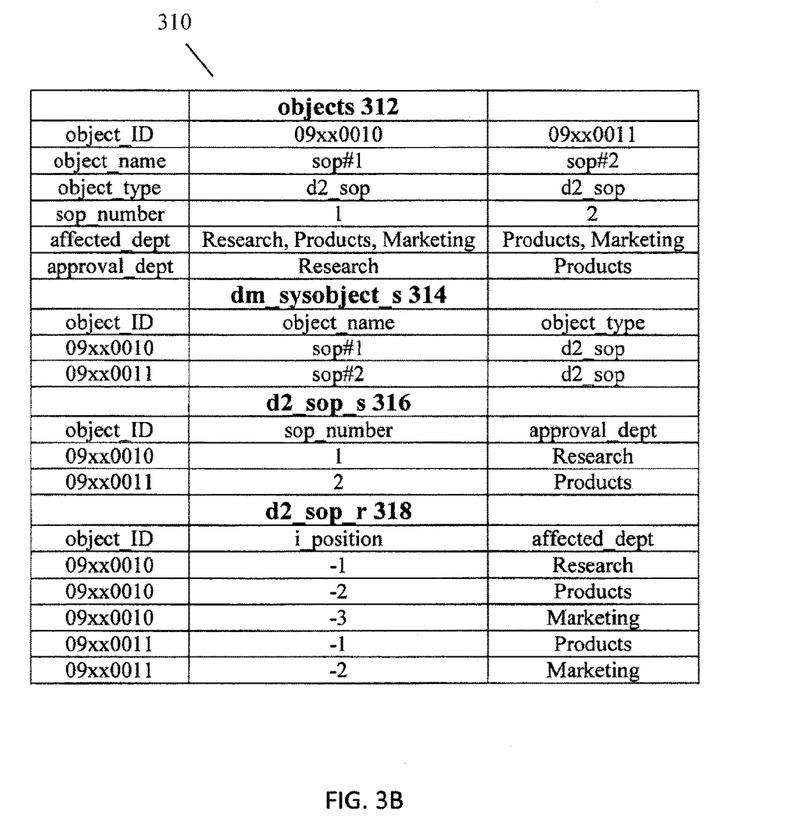

FIG. 3A and FIG. 3B illustrate block diagrams of example objects and tables for morphing object types in enterprise content management systems, under an embodiment. Although these examples in FIGS. 3A and 3B depict only two document types with two objects each to illustrate the morphing of an object type, enterprise content management systems may have hundreds of different document types with billions of objects.

FIG. 3A depicts set 300 of objects and tables, which includes objects 302, a table for dm_sysobject_s 304, a table for dcm_doc_s 306, and a table for dcm_doc_r 308. The set 300 may include other objects and tables that are not depicted in FIG. 3A, such as tables for dm_sysobject_r and dmi_object_type. FIG. 3B depicts set 310 of objects and tables, which includes objects 312, a table for dm_sysobject_s 314, a table for d2_sop_s 316, and a table for d2_sop_r 318. The set 310 may include other objects and tables that are not depicted in FIG. 3B, such as tables for dm_sysobject_r and dmi_object_type.

The set 310 represents the set 300 after the morphing tool 218 morphs object types associated with the set 300. The objects 312 represents the objects 302 after the morphing tool 218 morphs object types associated with the set 300. The objects 302 and 312 include the corresponding object type schemas and metadata.

The table dm_sysobject_s 314 represents the table dm_sysobject_s 304 after the morphing tool 218 morphs object types associated with the set 300. The table d2_sop_s 316 represents the table dcm_doc_s 306 after the morphing tool 218 morphs object types associated with the set 300. The table dm_sysobject_s 304 is the parent of the table dcm_doc_s 306, and the table dm_sysobject_s 314 is the parent of the table d2_sop_s 316. The table dcm_doc_s 306 and the table d2_sop_s 316 are source single value tables of metadata that specify single values of metadata associated with the corresponding content, such as the corresponding title and the corresponding creation date for corresponding human resource documents.

The table d2_sop_r 318 represents the table dcm_doc_r 308 after the morphing tool 218 morphs object types associated with the set 300. A table dm_sysobject_r, which is not depicted in FIG. 3A, is the parent of and includes the foreign keys for the table dcm_doc_r 308, and a table dm_sysobject_r 314, which is not depicted in FIG. 3B, is the parent of and includes the foreign keys for the table d2_sop_r 318. The table dcm_doc_r 308 and the table d2_sop_r 318 are source repeat value tables of metadata that specify repeat values of metadata associated with the corresponding content, such as the corresponding multiple authors and the corresponding multiple keywords for the corresponding human resource documents.

A system user may access a web based interface for the morphing tool 218 via the client 202 to create a map that maps properties associated with an object type to properties associated with a new object type. For example, the morphing tool 218 creates the text properties file 220 that maps properties associated with a dcm_doc object type depicted in the objects 302 to properties associated with a d2_sop object type depicted in the objects 312, which includes an approval_dept property that the objects 302 lack, such that the text properties file 220 may be based on data that is external to the Documentum database 208. Although this example describes the text properties file 220 that maps from an old object type that lacks a new property to a new object type that includes the new property, the text properties file 220 can map from an old object type that includes an old property to a new object type that lacks the old property. For example, a new object type may lack a property for an old object type because an organization may decide to discontinue the requirement for a department to approve a specific document type, thereby selectively retaining only the useful metadata in new object types for objects which have their object type changed. By mapping old object types to new object types at the granular property level, the morphing tool 218 morphs object types without requiring enterprise content management system administrators to engage in the lengthy and error-prone process of personally writing customized code to retain customized changes. Furthermore, such custom mapping may enable consolidation of object types, where multiple legacy object types are combined into a single new object type, and bursting of object types, where a single legacy object type is split into multiple new object types. An example of the text properties file 220 is:

newname=new_type
oldname=old type
propcount=3
prop.0.oldname=affected area
prop.O.newname=affected area
prop.0.valuecount=2
prop.O.value.O.oldvalue=MKT
prop.0.value.0.newvalue=Marketing
prop.O.value.1.oldvalue=RND
prop.O.value.1.newvalue=Research
prop.O.mapperclass=com.emc.monorail.transform.
　ValueListMapper
prop.1.oldname=document_class
prop.1.newname=review period
prop.1.mapperclass=com.emc.monorail.transform.
　ConstantValueMapper
prop.1.constantvalue=48 Months
prop.1.valuecount=O
prop.2.oldname=doc number
prop.2.newname=doc number
prop.2.mapperclass=com.emc.monorail.transform.
　ComboMapper
prop.2.pattern=Num-${test2}-A
prop.2.valuecount=O A morphing tool selects a map and loads the map by specifying a path to the map. For example, the morphing tool 218 selects the text properties file 220, and loads the text properties file 220 for morphing use by specifying a path to the text properties file 220. While such a process of creating the text properties file 220 and subsequently selectively loading the text properties file 220 may appear to be inefficient in this extremely simplified example that uses only one map, the creation of hundreds of maps and the subsequent selection and loading of one of the hundreds of maps in a real-life example is a highly efficient procedure.

A morphing tool queries a database associated with an enterprise content management system to retrieve objects based on the object type. For example, the morphing tool 218 queries the Documentum® database 208 and retrieves the two dcm_doc objects depicted in the objects 302 for the dcm_doc object type based on the text properties file 220. In contrast to prior art morphing tools that use an inefficient application program interface to retrieve objects, which involves the high costs of acquiring sessions to indirectly interact with a database that is several layers below the application program interface, the morphing tool 218 quickly executes efficient remote procedure calls to directly interact with a database at the level of the database. Therefore, the morphing tool 218 retrieves object types without creating a significant number of audit trail objects for the change. The morphing tool 218 has the memory, capacity, and capability to directly interact with an Oracle® database, a SQL® database, an IBM® DB2® database, or any other type of relational database. The morphing tool 218 retrieves the objects 216 via the database's object view on a table-by-table basis. An object view is a highly optimized view of requested data that can provide metadata tables and additional data for the metadata tables. An object view facilitates co-existence of a relational database with an object-oriented tool, and a gradual morphing process for legacy object types.

A morphing tool stores objects in a staging database. For example, the morphing tool 218 stores the two dcm_doc objects depicted in the objects 302 as Java Script Object Notation (JSON) metadata in metadata tables in the Mongo® database 210. In contrast to prior art morphing tools that inefficiently morph object types in small batches, which may therefore require many months to morph the object types to upgrade an enterprise content management system, the morphing tool 218 quickly and efficiently stores objects to and subsequently retrieves objects from a NoSQL non-relational database, which enables significant amounts of objects to be morphed in a very small amount of time, such as a couple of weeks to morph the object types to upgrade an enterprise content management system.

A morphing tool deletes objects from a database. For example, the morphing tool 218 deletes the two dcm_doc objects depicted in the objects 302, as well as the corresponding tables 304-308, from the Documentum® database 208. In contrast to prior art morphing tools that use an inefficient application program interface to delete objects, which involves the high costs of acquiring sessions to indirectly interact with a database that is several layers below the application program interface, the morphing tool 218 quickly executes efficient remote procedure calls to directly interact with a database at the level of the database. Therefore, the morphing tool 218 deletes object types without creating a significant number of audit trail objects. Furthermore, the morphing tool 218 may selectively delete objects from the Documentum® database 208, such as deleting all of the properties associated with the old object that are not retained by the new object, or retaining all of the properties that are no longer retained in the new object for audit trail and compliance requirements.

A morphing tool creates property tables in a database based on a new object type. For example, the morphing tool 218 needs placeholder property tables in the Documentum® database 208 for the objects 216 to be migrated back from the Mongo® database 210, so the morphing tool 218 creates the property tables 222, which include the tables 314-318, for the d2_sop object type in the Documentum® database 208 based on the XML map 220.

A morphing tool migrates objects from a staging database to newly created property tables based on a map. For example, the morphing tool 218 migrates the two dcm_doc objects from the Mongo® database 210 to the property tables 222 for the d2_sop object type in the Documentum® database 208 based on the text properties file 220, thereby creating the new objects 312 and their corresponding tables 314-318 in the Documentum® database 208. The new objects 312 retain the same object identifiers as the legacy objects 302, thereby retaining the audit trails, the workflows, and the lifecycles for the objects 216. In contrast to retrieving the objects 216 via the database's object view, the morphing tool 218 re-migrates the objects 216 to the Documentum® database 208 on a table-by-table basis. In contrast to prior art morphing tools that use an inefficient application program interface to store objects, which involves the high costs of acquiring sessions to indirectly interact with a database that is several layers below the application program interface, the morphing tool 218 quickly executes efficient remote procedure calls to directly interact with a database at the level of the database. Therefore, the morphing tool 218 stores objects without creating a significant number of audit trail objects. After storing the objects 216, the morphing tool 218 engages in housekeeping tasks, such as modifying an i_type value in a dmi_object_type table that provides lookup values for versions and the last modifications, and modifying a r_object type in a dm_sysobject_s table object.

The morphing tool 218 directly extracts and loads data at the database level, enabling the morphing of object types more quickly and efficiently than prior art morphing tools, selectively retaining only the useful metadata for objects which have their object type changed. The morphing tool 218 also morphs object types without creating a significant number of audit trail objects for the change, and without requiring enterprise content management system administrators to engage in the lengthy and error-prone process of personally writing customized code to retain customized changes.

Figure 4:
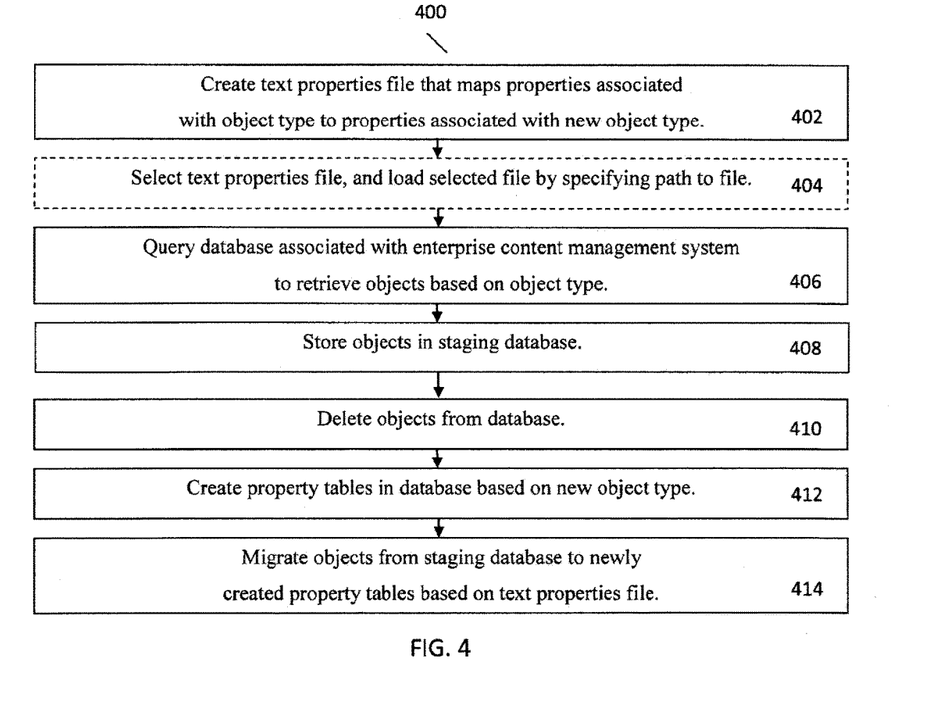
FIG. 4 is a flowchart that illustrates a method of morphing object types in enterprise content management systems, under an embodiment.

FIG. 4 is a flowchart that illustrates a method of morphing object types in enterprise content management systems. Flowchart 400 illustrates method acts illustrated as flowchart blocks for certain steps involved in and/or between the client 202 and/or the servers 204-206 of FIG. 2.

A map is created that maps properties associated with an object type to properties associated with a new object type, act 402. For example, the morphing tool 218 creates the XML map 220 that maps properties associated with a dcm_doc object type to properties associated with a d2_sop object type, which includes an approval_dept property that the dcm_doc object type lacks.

A map is optionally selected and loaded by specifying a path to the map, act 404. For example, the morphing tool 218 selects the XML map 220, and loads the XML map 220 for morphing use by specifying a path to the XML map 220.

A database associated with an enterprise content management system is queried to retrieve objects based on an object type, act 406. For example, the morphing tool 218 queries the Documentum® database 208 and retrieves two dcm_doc objects 216 for the dcm_doc object type.

Objects are stored in a staging database, act 408. For example, the morphing tool 218 stores two dcm_doc objects 216 in the Mongo® database 210.

Objects are deleted from a database, act 410. For example, the morphing tool 218 deletes the two dcm_doc objects 216 from the Documentum® database 208.

Property tables are created in a database based on a new object type, act 412. For example, the morphing tool 218 creates the property tables 222 for a d2_sop object type in the Documentum® database 208.

Objects are migrated from a staging database to newly created property tables based on a map, act 414. For example, the morphing tool 218 migrates two dcm_doc objects from the Mongo® database 210 to the property tables 222 for the d2_sop object type in the Documentum® database 208 based in the text properties file 220, thereby creating two new d2_sop objects in the Documentum® database 208.

Although FIG. 4 depicts the acts 402-414 occurring in a specific order, the acts 402-414 may occur in another order. Embodiments herein enable morphing object types in enterprise content management systems. The morphing tool 218 directly extracts and loads data at the database level, enabling the morphing of object types more quickly and efficiently than prior art morphing tools, selectively retaining only the useful metadata for objects which have their object type changed. The morphing tool 218 also morphs object types without creating a significant number of audit trail objects for the change, and without requiring enterprise content management system administrators to engage in the lengthy and error-prone process of personally writing customized code to retain customized changes.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for morphing object types in enterprise content management systems, the system comprising:
    at least one processor;
    a non-transitory computer readable medium storing a plurality of instructions, which when executed by the at least one processor, cause the at least one processor to:
        create a text properties file that maps properties associated with a first object type to properties associated with a second object type, the first object type being different than the second object type;
        query an enterprise content management database for a plurality of objects of the first object type by executing a remote procedure call to the enterprise content management database to directly interact with the enterprise content management database at a level of the enterprise content management database among several levels of an enterprise content management system;
        retrieve the plurality of objects of the first object type from the enterprise content management database, wherein the properties associated with the first object type have been mapped to the properties associated with the second object type in the text properties file;
        store the retrieved plurality of objects in a staging database;
        delete the plurality of objects of the first object type from the enterprise content management database in response to the retrieved plurality of objects being stored in the staging database;
        create at least one property table in the enterprise content management database for the second object type;
        migrate the plurality of objects of the first object type from the staging database to the at least one property table created in the enterprise content management database for the second object type based on the mapping of the first object type with the second object type in the text properties file wherein the plurality of objects of the first object type are stored as objects of the second object type in the at least one property table; and
        selectively retain only a portion of metadata of objects of the plurality of objects whose object type is changed.

2. The system of claim 1, wherein at least one of the properties associated with the first object type comprise at least some of the properties associated with the second object type, the properties associated with the second object type correspond to at least some of the properties associated with the first object type, and the properties associated with the second object type comprise properties absent from the properties associated with the first object type.

3. The system of claim 1, wherein the plurality of objects comprises a plurality of schemas and a plurality of metadata associated with the plurality of objects.

4. The system of claim 1, wherein storing the plurality of objects in the staging database comprises storing the plurality of objects in a NoSQL non-relational database hosted in a staging environment.

5. The system of claim 4, wherein migrating the plurality of objects from the staging database comprises retrieving metadata tables from the NoSQL non-relational database.

6. The system of claim 1, wherein the non-transitory computer readable medium stores further instructions, which when executed by the at least one processor, cause the at least one processor to select the text properties file, and load the selected text properties file by specifying a path to the text properties file.

7. A computer-implemented method for morphing object types in enterprise content management systems, the method comprising:
    creating a text properties file that maps properties associated with a first object type to properties associated with a second object type, the first object type being different than the second object type;
    querying an enterprise content management database for a plurality of objects of the first object type by executing a remote procedure call to the enterprise content management database, wherein executing the remote procedure call enables a direct interaction with the enterprise content management database at a level of the enterprise content management database among several levels of an enterprise content management system;
    retrieving the plurality of objects of the first object type from the enterprise content management database, wherein the properties associated with the first object type have been mapped to the properties associated with the second object type in the text properties file;

storing the retrieved plurality of objects in a staging database;

deleting the plurality of objects of the first object type from the enterprise content management database in response to the retrieved plurality of objects being stored in the staging database;

creating at least one property table in the enterprise content management database for the second object type;

migrating the plurality of objects of the first object type from the staging database to the at least one property table created in the enterprise content management database for the second object type based on the mapping of the first object type with the second object type in the text properties file wherein the plurality of objects of the first object type are stored as objects of the second object type in the at least one property table; and selectively retaining only a portion of metadata of objects of the plurality of objects whose object type is changed.

8. The computer-implemented method of claim 7, wherein at least one of the properties associated with the first object type comprise at least some of the properties associated with the second object type, the properties associated with the second object type correspond to at least some of the properties associated with the first object type, and the properties associated with the second object type comprise properties absent from the properties associated with the first object type.

9. The computer-implemented method of claim 7, wherein the plurality of objects comprises a plurality of schemas and a plurality of metadata associated with the plurality of objects.

10. The computer-implemented method of claim 7, wherein storing the plurality of objects in the staging database comprises storing the plurality of objects in a NoSQL non- relational database hosted in a staging environment.

11. The computer-implemented method of claim 10, wherein migrating the plurality of objects from the staging database comprises retrieving metadata tables from the NoSQL non-relational database.

12. The computer-implemented method of claim 7, wherein the method further comprises selecting the text properties file, and loading the selected text properties file by specifying a path to the text properties file.

13. A computer program product, comprising a non-transitory computer readable medium having a computer-readable program code embodied therein, the computer readable program code adapted to be executed by one or more processors to implement a method for morphing object types in enterprise content management systems, the method comprising:

creating a text properties file that maps properties associated with a first object type to properties associated with a second object type, the first object type being different than the second object type;

querying an enterprise content management database for a plurality of objects of the first object type by executing a remote procedure call to the enterprise content management database, wherein executing the remote procedure call enables a direct interaction with the enterprise content management database at a level of the enterprise content management database among several levels of an enterprise content management system;

retrieving the plurality of objects of the first object type from the enterprise content management database, wherein the properties associated with the first object type have been mapped to the properties associated with the second object type in the text properties file;

storing the retrieved plurality of objects in a staging database;

deleting the plurality of objects of the first object type from the enterprise content management database in response to the retrieved plurality of objects being stored in the staging database;

creating at least one property table in the enterprise content management database for the second object type;

migrating the plurality of objects of the first object type from the staging database to the at least one property table created in the enterprise content management database for the second object type based on the mapping of the first object type with the second object type in the text properties file wherein the plurality of objects of the first object type are stored as objects of the second object type in the at least one property table; and selectively retaining only a portion of metadata of objects of the plurality of objects whose object type is changed.

14. The computer program product of claim 13, wherein at least one of the properties associated with the first object type comprise at least some of the properties associated with the second object type, the properties associated with the second object type correspond to at least some of the properties associated with the first object type, and the properties associated with the second object type comprise properties absent from the properties associated with the first object type.

15. The computer program product of claim 13, wherein the plurality of objects comprises a plurality of schemas and a plurality of metadata associated with the plurality of objects.

16. The computer program product of claim 13, wherein storing the plurality of objects in the staging database comprises storing the plurality of objects in a NoSQL non-relational database hosted in a staging environment.

17. The computer program product of claim 16, wherein migrating the plurality of objects from the staging database comprises retrieving metadata tables from the NoSQL non-relational database.

18. The computer program product of claim 13, wherein the method further comprises selecting the text properties file, and loading the selected text properties file by specifying a path to the text properties file.

* * * * *